United States Patent [19]

Otsuki et al.

[11] Patent Number: 5,511,055
[45] Date of Patent: Apr. 23, 1996

[54] OPTICAL DISK DEVICE WITH COOLING FAN

[75] Inventors: Tadashi Otsuki; Shizuo Arai; Tadayuki Nike, all of Kanagawa, Japan

[73] Assignee: Sony Corporation, Tokyo, Japan

[21] Appl. No.: 235,119

[22] Filed: Apr. 28, 1994

Related U.S. Application Data

[63] Continuation of Ser. No. 888,501, May 27, 1992, abandoned.

[30] Foreign Application Priority Data

May 31, 1991 [JP] Japan .................. 3-155457

[51] Int. Cl.⁶ ............................................. G11B 33/14
[52] U.S. Cl. .................. 369/75.1; 369/77.1; 360/97.02
[58] Field of Search ................... 369/75.1, 77.1, 369/77.2; 360/97.02, 97.03, 97.04; 361/381, 384, 395

[56] References Cited

U.S. PATENT DOCUMENTS

| | | | |
|---|---|---|---|
| 4,702,154 | 10/1987 | Dodson | 361/384 |
| 4,771,412 | 9/1988 | Aihara et al. | 369/75.1 |
| 4,899,254 | 2/1990 | Ferchau et al. | 361/384 |
| 5,086,422 | 2/1992 | Hagiya et al. | 369/75.1 |
| 5,191,230 | 3/1993 | Heung | 361/384 |
| 5,335,217 | 8/1994 | Kaneda et al. | 369/77.2 |

FOREIGN PATENT DOCUMENTS 63-104282  5/1988  Japan .................. 360/97.02

Primary Examiner—Stuart S. Levy
Assistant Examiner—Paul J. Ditmyer
Attorney, Agent, or Firm—William S. Frommer; Alvin Sinderbrand

[57] ABSTRACT

An optical disk device is adapted so that an air-cooling fan for cooling is attached to the back side of the optical disk device body unit. Further, in this optical disk device, a control board is disposed or arranged at the back side of the air-cooling fan so that it is integral with the optical disk device body unit to thereby cool heat produced in the optical disk device by blast of the cooling fan to allow the ambient temperature to fall within a specification limit, thus to facilitate the optical disk device to be included in a computer, etc.

4 Claims, 4 Drawing Sheets

OPTICAL DISK DEVICE WITH COOLING FAN

This application is a continuation of application Ser. No. 07/888,501, filed Jun. 27, 1992 now abandoned.

BACKGROUND OF THE INVENTION

1. Field of the Invention

This invention relates to an optical disk device adapted to carry out recording or reproduction of an information signal through a laser beam while rotating an optical disk, and more particularly to an optical disk device to which a measure for heat generated therein is taken.

2. Description of the Related Art

In memories or storages for a computer, a standard dimension so called a form factor is prescribed. Optical disk devices or units which are one of such memories or storages are commercialized in such a manner that they satisfy the requirement of the standard dimension. Explanation will be given by taking a more actual example of the standard dimension. For example, the so-called disk devices of the full height of 5.25 inches have a height ($H_F$) of 82.5 mm, a width ($W_F$) of 146.0 mm, and a depth ($D_F$) of 203.2 mm (height ($H_F$) is 3.25 inches, width ($W_F$) is 5.75 inches, and depth ($D_F$) is 8.00 inches in terms of the inch size). Further, disk devices of the half height of 3.5 inches have a height ($H_H$) of 41.3 mm, a width ($W_H$) of 101.6 mm, and a depth ($D_H$) of 146.0 mm (height ($H_H$) is 1.625 inches, width ($W_H$) is 4.00 inches, and depth ($D_H$) is 5.75 inches in terms of the inch size).

Meanwhile, it is well known in such optical disk devices that the weight of the pickup system, i.e., its movable part is large, and that heat resulting from light emitting driving of a laser beam or irradiation of a laser beam, or a quantity of heat in driving a linear voice coil motor is produced to considerably much degree. While ICS or electronic parts which are circuit components or elements constituting a light emitting control unit for a laser beam or an optical pickup and positioning control unit of the device itself are not affected by such heat, if the ambient internal temperature within the device is above 55° C. which is an upper limit specification of the temperature guarantee standard requirement as a recording medium, e.g., pits serving to record information signals into the recording medium are affected by heat, giving rises to inconveniences such that, e.g., tracking cannot sufficiently carried out. For this reason, there is the possibility that the optical disk device may fail to stably write information signals onto the recording medium. In order to allow the optical disk device to write information signals thereonto in a stable state at all times, the optical disk device is adapted so that the operation of the circuit therein is caused to be stopped at the time point when the internal temperature is above the aforementioned temperature.

Accordingly, in a computer control system adapted so that such optical disk device is attached therein, such optical disk device is arranged at the position in the vicinity of an air-cooling fan for cooling provided in an equipment such as the computer, etc., thus to cool the heat producing portions within the optical disk device. For this reason, it was necessary to allow flow of air within the computer control system dependent upon the position of the air-cooling fan for cooling to be securely in contact with the heat producing portions of the optical disk device, thus to cool those portions. As stated above, the arrangement position of the optical disk device is dependent upon the position of the air-cooling fan for cooling arranged within the computer control system. Namely, the degree of freedom of attachment position of the optical disk device in including this device within the computer control system becomes small. As a result, under present circumstances, it is difficult to manufacture a computer control system including such optical disk device therein.

In future, it is anticipated to realize products in which a small optical disk device having a large memory capacity is included in a computer control system or equipment, although such products have problems as described above. In addition, under the circumstances where there is a tendency that optical disk devices are being miniaturized, a measure for heat as mentioned above particularly in an optical magnetic disk device of 3.5 inches, for example, is very important mater.

OBJECTS AND SUMMARY OF THE INVENTION

With the above in view, an object of this invention is to provide an optical disk device of a structure in which an air-cooling fan is directly attached to the back or rear side of the optical disk device so that such optical disk device can be included in a computer control system, thus to carry out cooling of heat producing portions of the device body.

Another object of this invention is to provide an optical disk device wherein in the case where such an optical disk device is required in the system configuration of a computer control system, the above-mentioned air-cooling fan for cooling can be detached in disposing the optical disk device body at the position where a satisfactory cooling efficiency can be ensured or provided in the vicinity of a cooling device within the system, thus permitting the entirety of the system to be miniaturized.

To achieve the above-mentioned objects, an optical disk device according to this invention comprises an optical disk drive body unit including therein an optical head feed drive section for feeding an optical head in a radial direction of the optical disk and an optical disk rotational drive section for rotationally driving the optical disk; an air-cooling fan for cooling, adapted for cooling the optical disk drive body, provided at the back or rear side of the optical disk drive body; and a control board adapted for controlling the optical disk device, provided at the back or rear side of the air-cooling fan.

Further, the air-cooling fan for cooling is detachably disposed by providing tapped holes at the same positions as those of corresponding holes provided in a mounting bracket on the back side of the optical disk device body unit to screw-connect the mounting bracket to the optical disk device body unit through these holes by means of screws so that the former is fixed to the later to put or hold the side surfaces of a casing for accommodating an air-cooling fan for cooling between members formed by bending portions of a blast hole of the mounting bracket to the back side thereof, thus to screw-connect, at the time of attachment, the both surfaces of the casing for accommodating the air-cooling fan for cooling and the both surfaces of the mounting bracket through corresponding tapped holes provided therein by means of screws to fix the casing for accommodating the air-cooling fan for cooling and the mounting bracket.

The control board is such that the dimensions of a printed board on which electronic circuits are mounted are caused to be in correspondence with the dimensions of the back of the optical disk device body unit.

Further, the optical disk device is designed so that the height and the width thereof fall within the dimensions of 1.625 inches (H)×4.00 inches (W) at least in the half height, size of 3.5 inches.

In this optical disk device, the air-cooling fan for cooling is integrally attached to the back of the optical disk device body unit to directly cool the heat, producing sections. By this cooling, even with a small air-cooling fan, the cooling efficiency can be sufficiently improved.

In addition, even if the air-cooling fan for cooling is attached, by allowing the dimensions of height and width of at least, the standard dimension to fall within a standardized range, it is possible to easily include the air-cooling fan in a computer control system. Thus, the degree of freedom in the cooling system is permitted to be high.

Other object is and means will become clear from the description of the embodiment given below.

DETAILED DESCRIPTION OF THE PREFERRED EMBODIMENT

An embodiment of an optical disk device according to this invention will now be described with reference to the appearance perspective view shown in FIG. 1 and the dimensional drawings shown in FIGS. 2 to 4. Explanation will be given by taking the example where the optical disk device is applied to an optical magnetic disk device.

Figure 1:
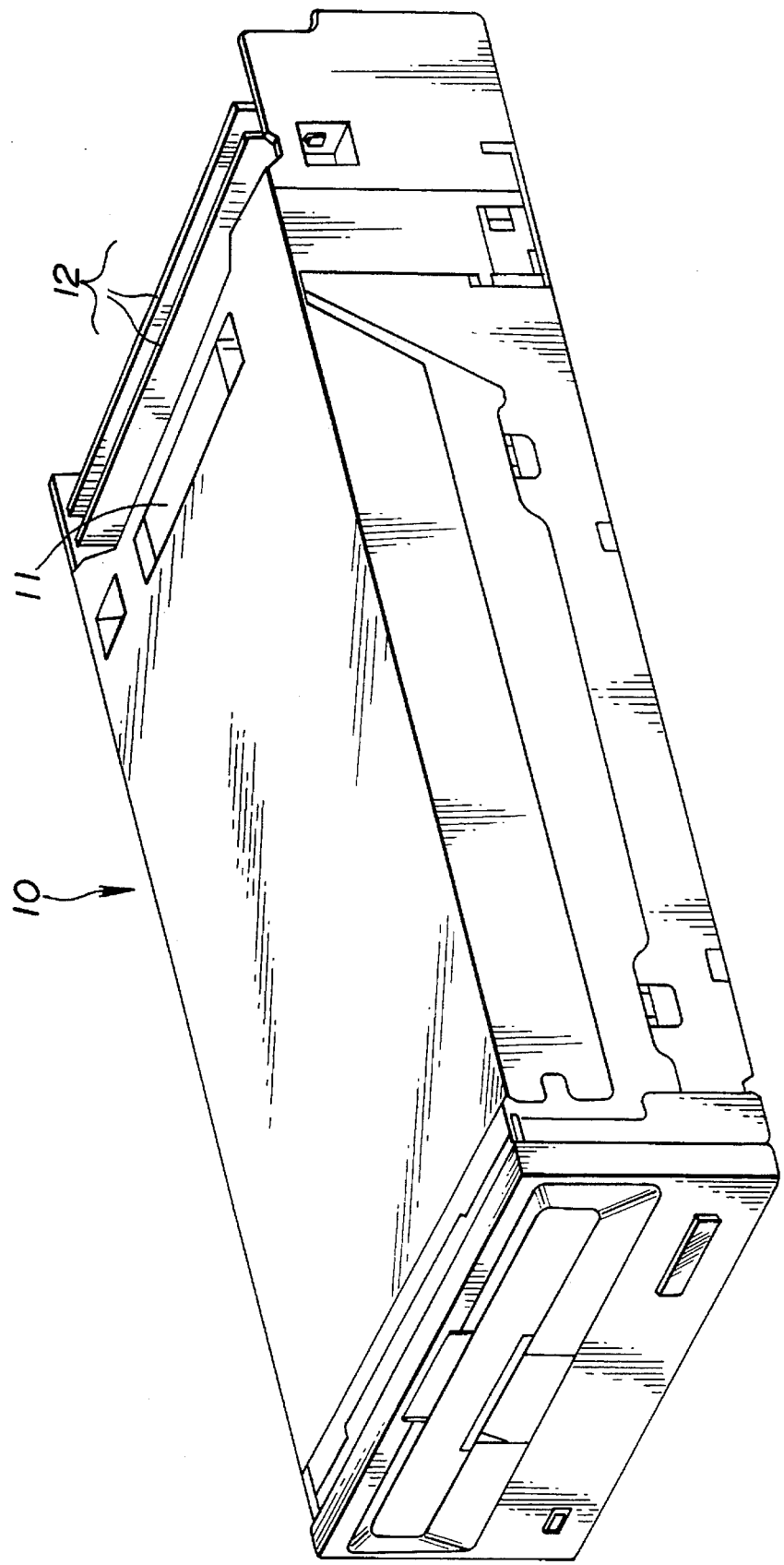
FIG. 1 is a perspective view showing the appearance of an embodiment of an optical disk device according to this invention.

The optical disk device shown in FIG. 1 includes an optical disk drive body unit 10 including therein an optical head feed drive section for feeding an optical head in a radial direction of the optical disk, and an optical disk rotational drive section for rotationally driving the optical disk; an air-cooling fan 11 for cooling, which is adapted to cool the body unit 10, provided on the back side of the optical disk drive body unit, and a control board assembly 12 for controlling the optical disk device, provided on the back side of the air-cooling fan.

The air-cooling fan 11 for cooling and the control board assembly 12 can be constituted so that they are integral with the optical disk device body by attachment to a sub-chassis 13 which will be described later.

It is assumed that the optical disk device shown in FIG. 1 is integrally constituted as the so-called 3.5 inch optical magnetic disk device and is used under the state where it is included in a system or equipment for computer control.

Here, the standard dimension of the half height is prescribed as previously described at $H_H$, $W_H$, $D_H$ in the standard dimension of so called a 3.5 inch half height optical magnetic disk device. However, dimensions of respective parts of the optical disk device of the embodiment of this invention are set so that at least only the height (H) and the width (W) thereof fall within the standard dimensions (maximum dimensions), and the depth is elongated or air-cooling fan for cooling is installed within the range of the standard dimension.

Figure 2:
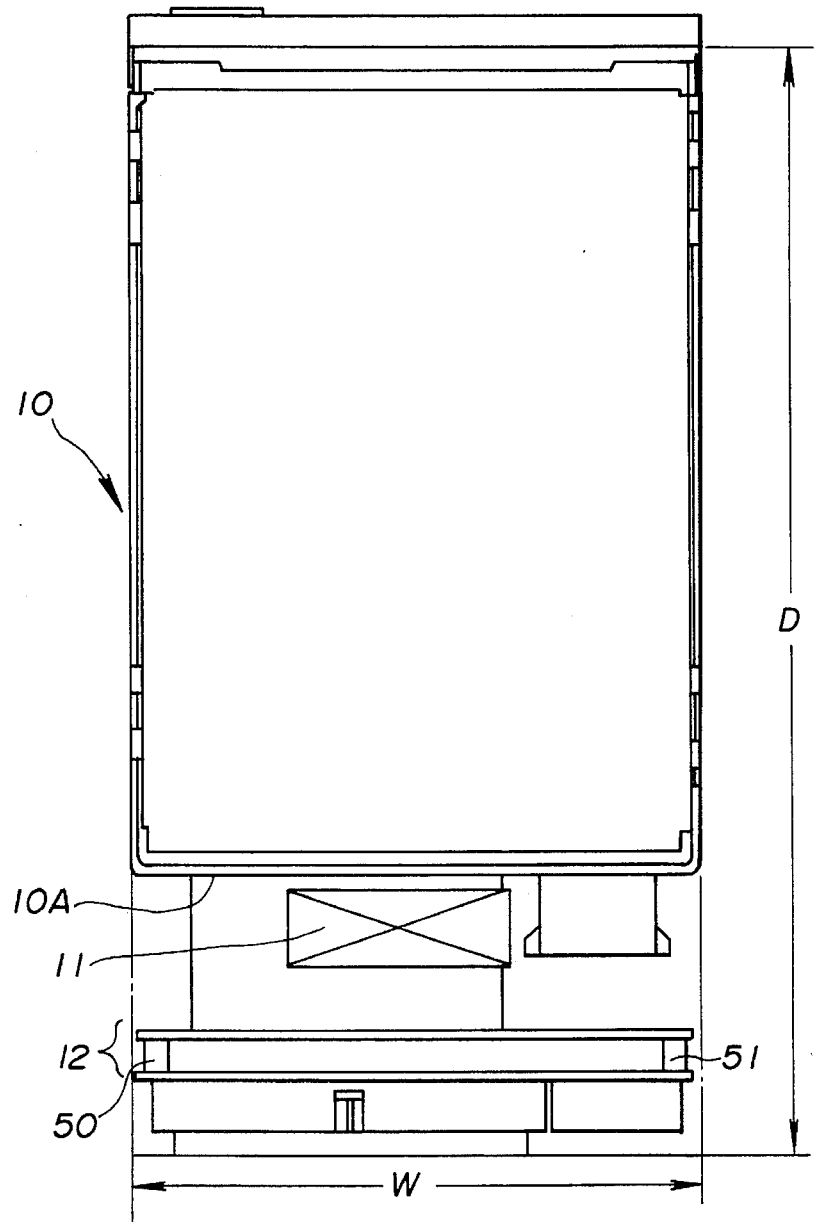
FIG. 2 is a plan view when viewed from the top of the optical disk device shown in FIG. 1.
Figure 3:
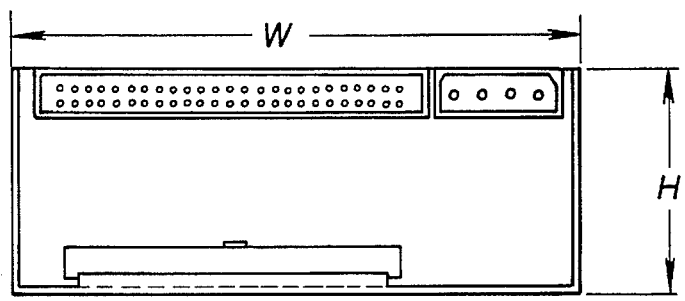
FIG. 3 is a back view of the optical disk device shown in FIG. 1.
Figure 4:
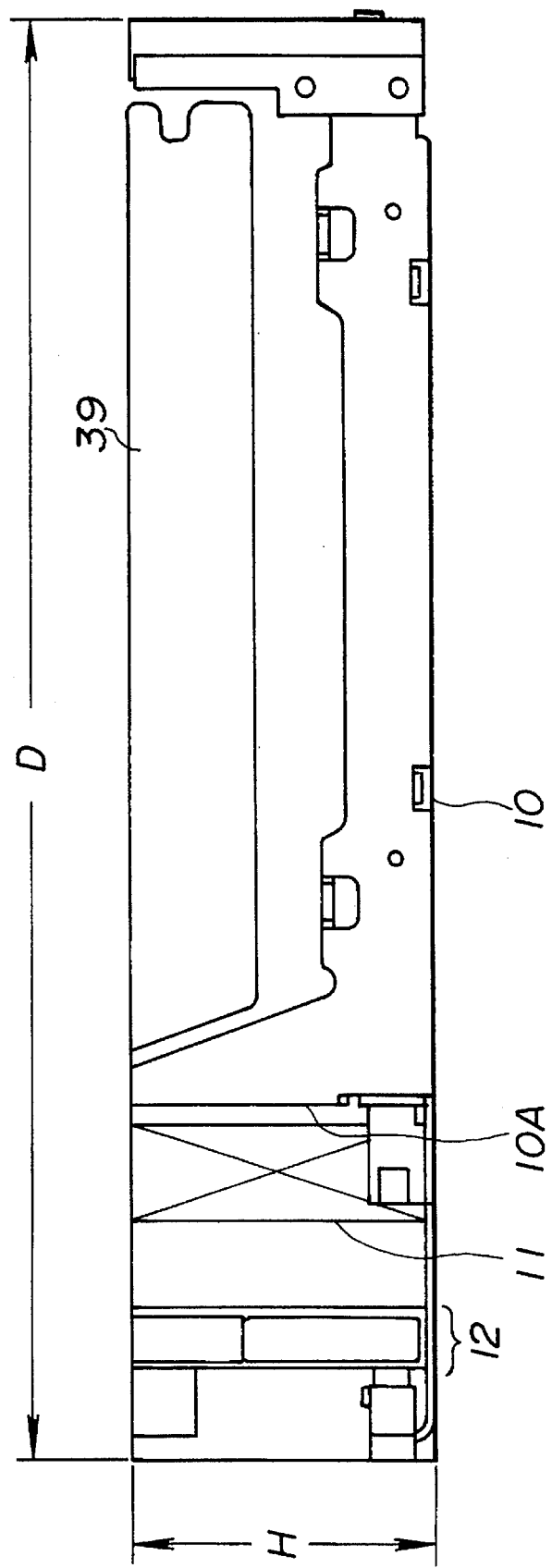
FIG. 4 is a side view of the optical disk device shown in FIG. 1.

Particularly, in the dimensional drawings of FIGS. 2 to 4, the maximum dimensions are set so that the height (H) is 41.3 mm, the width (W) is 101.6 mm, and the depth (D) is 146.0 mm (the height (H) is 1.625 inches, the width (W) is 4.00 inches, and the depth (D) is 5.75 inches in the case of inch size), thus to satisfy the above-mentioned condition.

Here, the same reference numerals as those attached in FIG. 1 are respectively attached to portions common in FIGS. 2 to 4, and their explanation will be omitted.

FIG. 2 shows a plan view when viewed from the top of the optical disk device wherein the width (W) and the depth (D) of the entirety of the optical disk device are shown. Further, FIG. 3 shows a view when viewed from the back side of the optical disk device wherein the width (W) and the height (H) of the entirety of the optical disk device are shown. In addition, FIG. 4 is a view when viewed from the side surface of the optical disk device wherein the depth (D) and the height (H) of the entirety thereof are shown, The optical disk device body unit 10 shown in FIG. 1 includes a tracking servo system for precisely tracing tracks, a focus servo system for allowing a laser beam to be focused on a recording surface, a spindle servo system for precisely rotating the optical disk, and a linear voice coil motor servo system for moving the optical head to a target or objective track.

Meanwhile, in such 3.5 inch optical magnetic disk device, a quantity of heat produced at the time of reading out recording signals from respective hardwares comes to about 10 W. By this heat, the internal temperature within the optical magnetic disk device becomes more than 60° C. This internal temperature deviates from the standard requirements prescribing the operation of the optical disk device. For this reason, there is employed a configuration to attach air-cooling fan 11 on the back 10A side of the optical disk device body unit 10 to cool the optical disk device body unit 10. Particularly, in the case where the air-cooling fan is integrally provided, there is employed an arrangement such that wind for cooling a laser light, emitting section which is one of the heat producing sections is directly swept.

Explanation will now be given with reference to the exploded perspective view of the optical disk device shown in FIG. 5.

Figure 5:
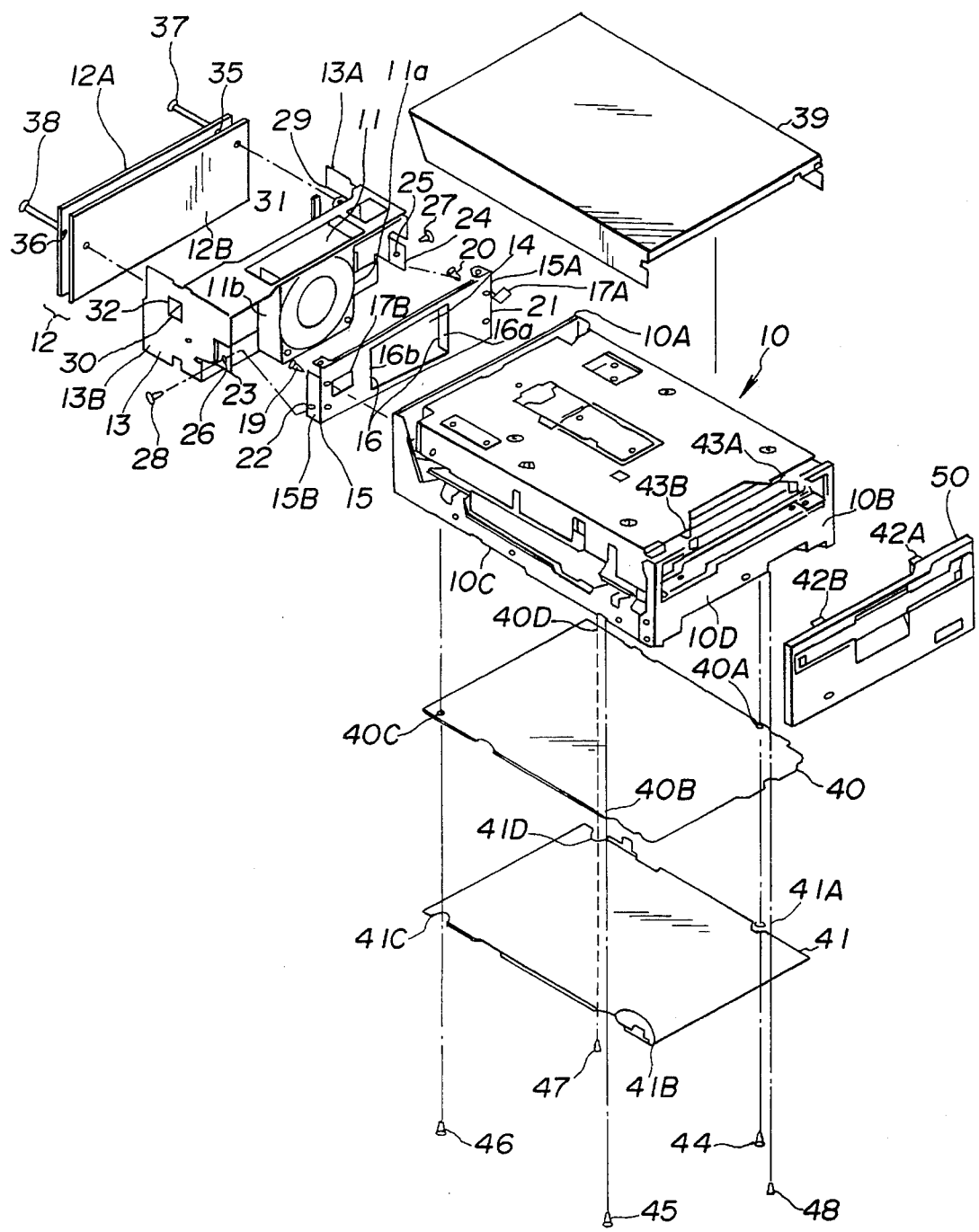
FIG. 5 is an exploded perspective view of the optical disk device shown in FIG. 1.

Here, the same reference numerals as those attached in FIG. 1 are respectively attached to the portions common in FIG. 5, and their explanation will be omitted.

At the sub-chassis of the back portion 10A of the optical disk device body, a blast hole (not shown) for cooling the optical disk device body by wind from the air-cooling fan 11 for cooling is provided.

Further, a mounting bracket 15 is provided with a blast hole 14 corresponding to the position of the blast hole provided on the back 10A side of the optical disk device body unit 10. Both side pieces 16 of the mounting bracket 15 in providing this blast hole 14 are bent to the cooling air-cooling fan 11 side. Respective inside surfaces 16a, 16b of the both side pieces 16 formed by bending are caused to be in contact with the side surfaces 11a, 11b of a section or casing for accommodating the air-cooling fan for cooling to put the air-cooling fan 11 for cooling between the inner side surfaces of the portion of the mounting bracket 15 in which the blast hole 14 is defined or formed. In this way, by putting the air-cooling fan 11 for cooling between the respective side surfaces 16a, 16b of the both side pieces 16 of the mounting bracket 15 in allowing the mounting bracket 15 to be integral with the air-cooling fan 11 for cooling, the mounting bracket 15 can hold or retain the air-cooling fan 11 for cooling, Moreover, this mounting bracket 15 is fixedly screw-connected to the back surface 10A of the optical disk device body unit 10 provided with tapped holes (not shown), by means of screws 19, 20 through two holes 17A, 17B of the mounting bracket 15, tapped in the same manner as in the above-mentioned holes.

Further, both ends 15A, 15B of the mounting bracket 15 are bent to the side of the air-cooling fan 11 for cooling with a width smaller than the maximum width and sufficient to carry out connection by screw with the sub-chassis. The fixing portions of the both ends 15A, 15B bent as above are provided with holes 21, 22 provided in order to allow the mounting bracket 15 to be integral with the sub-chassis 13. These holes 21, 22 are similarly tapped.

Further, connecting portions 23, 24 with the mounting bracket 15 formed bent in the sub-chassis 13 are respectively provided with holes 25, 26 provided so as to become in correspondence with holes 21, 22 in allowing the sub-chassis 13 to be integral with the mounting bracket 15.

When the holes 21, 22 are caused to be respectively in correspondence with the holes 25, 26, the sub-chassis 13 and the mounting bracket 15 are screw-connected by screws 27, 28 and are fixed to each other.

Furthermore, portions 29, 30 of the side portions 13A, 13B of the sub-chassis 13 are cut to bent them perpendicularly to the inward direction of the side portions 13A, 13B.

In the portions 29, 30 projected from the side portions 13A, 13B, tapped holes 31, 32 are provided. In the control board assembly 12, respective two holes 35, 36 are provided every printed boards so as to become in correspondence with the positions of these holes 31, 32, In the control boards 12A, 12B, so called a SCSI interface for carrying out input/output from and to an external apparatus is provided, By the requirement of the standard dimension that at least the height (H) and the width (W) of the optical disk device are caused to respectively fall within the ranges of 41.3 mm and 101.6 mm, two printed boards on which circuits such as SCSI interface, etc. are mounted constitute the control board assembly 12. Between these two control boards 12A, 12B, connection connectors 50, 51 are arranged as shown by the top view of FIG. 2.

The control boards 12A, 12B are caused to be correspondence with the positions of holes 31, 32 provided in the projected portions 29, 30 of the sub-chassis 13, and are screw-connected and fixed to the back side of the sub-chassis 13 by means of screws 37, 38 inserted from the control board 12A side.

Further, an upper panel 39 is subjected to positioning above the optical disk device body unit 10 and is then disposed or arranged thereon. Then, a board 40 is disposed or arranged on the bottom surface. 10C side of the optical disk device body unit 10. On the board 40, a bottom panel 41 is disposed or arranged from the downward direction.

Respective holes 40A to 40D of the board 40 are provided so that they are in correspondence with the positions of respective holes 41A, 41C within recessed portions of the bottom panel 41 and holes (not shown) provided on the bottom surface 10C side of the body.

Further, cut portions 41B, 41D correspondingly located at the positions of the holes 40B, 40D of the board 40 in the bottom panel 41 are cut to have dimensions such that screws 45, 47 are not in contact therewith. Respective holes on the bottom 10C side of the body are tapped. The board 40 serving as an insulating panel and the bottom panel 41 are screw-connected to the body bottom 10C side by means of screws 44 to 48 so that they are integral therewith.

Further, a front panel 50 is attached on the front 10D side of the body unit 10. To carry out such attachment, the front panel 50 is provided, on the front 10D side of the body unit 10, as shown in FIG. 1, with projected portions 42A, 42B. Further, on the front 10D side of the body 10, holes 43A, 43B for engaging and disposing these projected portions 42A, 42B are provided. In addition, the projected portions 42A, 42B are in the form of claw.

As stated above, in the optical disk device, the air-cooling fan 11 for cooling and the control board assembly 12 are integral with each other. By such provision of the air-cooling fan 11 for cooling, wind directly blows the heat producing portions, thus making it possible to cool them. Thus, stop of the operation due to elevation of an ambient temperature can be avoided. Since this optical disk device is constituted so that respective dimensions fall within the dimensional standard requirement of the height and the width of at least the standard dimensions, assembling into an equipment such as a computer, etc., or design in assembling can be easily carried out. As an actual example of advantages or effects in a system design such as an assembling into an equipment such as a computer, etc., advantages/effects described below are pointed out.

If, in attaching this optical disk device to the internal portion of an equipment or system such as a computer, etc., an air-cooling fan that the computer control system has is disposed or arranged at a suitable position where a sufficient cooling efficiency is ensured or provided in order to cool the optical disk device body unit 10, a procedure may be employed to attach only the body unit 10 without attaching the air-cooling fan 11 for cooling, thereby making it possible to realize further miniaturization. Further, since the air-cooling fan 11 used in this case is attached to the back 10A side by a simple structure such that it is put between predetermined portions of the mounting bracket and is connected by screws as described above, the air-cooling fan can be easily detached when needed.

In addition, when the control board assembly 12 is prescribed so that its dimensions are in correspondence with dimensions adapted to be attached to the optical disk device, it, is possible to quickly supply a control board corresponding to the user specification by using a method of exchanging it with a board on which, e.g., connectors of various standard requirements having different, numbers of pins are provided, or the like.

What is claimed is:

1. An optical disk device comprising:

an optical disk drive body unit including therein an optical head feed drive section for feeding an optical head in a radial direction of an optical disk, and an optical disk drive section for rotationally driving the optical disk, an air-cooling fan for cooling said optical disk drive body unit, and a control board assembly for controlling said optical disk device and being further adapted to be coupled to an external apparatus and to perform input/output processing for enabling communication between said optical disk device and said external apparatus, and a mounting bracket mounted to a back surface of said optical disk drive body unit for holding said air-cooling fan and said control board assembly such that said air-cooling fan is arranged on said back side of said optical disk drive body unit and said control board assembly is arranged on a back side of said air-cooling fan.

2. An optical disk device comprising:

an optical disk drive body unit including therein an optical head feed drive section for feeding an optical head in a radial direction of an optical disk, and an optical disk drive section for rotationally driving the optical disk;

an air-cooling fan for cooling said optical disk drive body unit;

a control board assembly for controlling said optical disk device; and a mounting bracket mounted to a back surface said optical disk drive body unit for detachably holding said air-cooling fan and said control board assembly such that said air-cooling fan is arranged on said back side of said optical disk drive body unit and said control board assembly is arranged on a back side of said air-cooling fan;

wherein when said optical disk device is to be disposed in a system in the vicinity of a cooling unit therein so as to ensure a predetermined cooling efficiency, said optical disk device is disposed within the system with said air-cooling fan being detached therefrom.

3. An optical disk device as set forth in claim 2, wherein said mounting bracket having bent portions between which a blast hole for passing an air flow is provided, said bent portions holding sides of said air-cooling fan, and said air-cooling fan being detachably disposed to said mounting bracket by providing tapped holes at positions corresponding to holes in said mounting bracket to screw-connect said air-cooling fan to said mounting bracket through said tapped and corresponding holes.

4. An optical disk device as set forth in claim 2, wherein the dimensions of said control board assembly respectively substantially correspond with the dimensions of the back of said optical disk drive body unit.

* * * * *